United States Patent
Nonato de Paula et al.

(10) Patent No.: US 10,030,708 B2
(45) Date of Patent: Jul. 24, 2018

(54) ROLLER BEARING CAGE FOR USE IN A GEARBOX

(71) Applicant: General Electric Company, Schenectady, NY (US)

(72) Inventors: Fabio Nonato de Paula, Niskayuna, NY (US); Bugra Han Ertas, Niskayuna, NY (US); Darren Hallman, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/223,228

(22) Filed: Jul. 29, 2016

(65) Prior Publication Data

US 2018/0031039 A1 Feb. 1, 2018

(51) Int. Cl.
*F16C 33/46* (2006.01)
*F16H 57/08* (2006.01)
(Continued)

(52) U.S. Cl.
CPC ............ *F16C 33/4611* (2013.01); *F02C 7/36* (2013.01); *F16C 33/4623* (2013.01); *F16H 1/28* (2013.01);
(Continued)

(58) Field of Classification Search
CPC .............. F16C 33/4611; F16C 33/4623; F16C 2360/03; F16C 2361/61; F02C 7/36; F16H 1/28; F16H 57/07; F16H 2057/085; F16H 3/089; F16H 57/082; F05D 2240/50; F05D 2260/40311; F05D 2250/283; F05D 2250/291; B29C 45/14819
(Continued)

(56) References Cited

U.S. PATENT DOCUMENTS

RE15,711 E * 10/1923 Baker ...................... F16H 3/64
475/204
2,987,350 A * 6/1961 Hay .................... F16C 33/3831
184/99
(Continued)

FOREIGN PATENT DOCUMENTS

CN 103032456 A 4/2013
CN 104454970 A 3/2015
(Continued)

OTHER PUBLICATIONS

Liu, Yankui et al.; "Stiffness Analysis of Pre-Loaded Hollow Cylindrical Roller Bearings Based on ABAQUS"; Educational and Network Technology International Conference; Qinhuangdao, Hebei, China; 2010; pp. 438-440.
(Continued)

*Primary Examiner* — Marcus Charles
(74) *Attorney, Agent, or Firm* — GE Global Patent Operation; Nitin Joshi

(57) ABSTRACT

A roller bearing cage includes a cylindrical body including a plurality of pocket holes defined within and positioned circumferentially about the cylindrical body. At least a portion of the cylindrical body is hollow. The roller bearing cage further includes a reinforcement structure extending within the portion of the cylindrical body. The reinforcement structure is configured to provide a stiffening force to the cylindrical body.

20 Claims, 6 Drawing Sheets

(51) Int. Cl.
*F02C 7/36* (2006.01)
*F16H 1/28* (2006.01)

(52) U.S. Cl.
CPC ......... *F16H 57/08* (2013.01); *F05D 2240/50* (2013.01); *F05D 2260/40311* (2013.01); *F16C 2360/23* (2013.01); *F16C 2361/61* (2013.01); *F16H 2057/085* (2013.01)

(58) Field of Classification Search
USPC ............... 384/470, 527–528, 548, 577–578; 475/162, 214, 218, 220, 331; 264/279; 416/160, 170 R; 74/606 R, 391
See application file for complete search history.

(56) References Cited

U.S. PATENT DOCUMENTS

| | | | | |
|---|---|---|---|---|
| 3,162,493 | A | * | 12/1964 | Heinz ................. F16C 33/3831 384/527 |
| 3,198,735 | A | * | 8/1965 | Devine .................... C10M 7/00 384/463 |
| 3,529,875 | A | * | 9/1970 | McKee ............... F16C 33/3831 384/469 |
| 4,073,552 | A | * | 2/1978 | Christy ............... F16C 33/3831 384/470 |
| 4,541,739 | A | * | 9/1985 | Allen ...................... F16C 33/44 384/470 |
| 4,781,877 | A | * | 11/1988 | Rabe ................. B29C 45/14778 264/130 |
| 5,230,570 | A | * | 7/1993 | Bursey, Jr. .......... F16C 33/3831 384/527 |
| 5,558,593 | A | * | 9/1996 | Roder ...................... F16H 1/28 475/331 |
| 6,513,981 | B2 | * | 2/2003 | Ooitsu .................... F16C 33/44 29/898.067 |
| 7,008,115 | B2 | * | 3/2006 | Nakata .................... F16C 19/38 384/463 |
| 7,458,723 | B2 | * | 12/2008 | Menges ................. F16C 29/065 384/13 |
| 8,123,413 | B2 | | 2/2012 | Tambe et al. |
| 8,172,717 | B2 | | 5/2012 | Lopez et al. |
| 8,198,744 | B2 | | 6/2012 | Kern et al. |
| 8,235,861 | B2 | | 8/2012 | Lopez et al. |
| 8,287,423 | B2 | | 10/2012 | Lopez et al. |
| 8,298,114 | B2 | | 10/2012 | Lopez et al. |
| 8,459,872 | B2 | | 6/2013 | Nies |
| 8,491,435 | B2 | | 7/2013 | Ghanime et al. |
| 8,506,446 | B2 | | 8/2013 | Minadeo et al. |
| 8,517,672 | B2 | | 8/2013 | McCooey |
| 8,550,955 | B2 | | 10/2013 | Erno et al. |
| 8,550,957 | B2 | | 10/2013 | Erno et al. |
| 8,657,714 | B1 | | 2/2014 | Ghanime et al. |
| 8,696,314 | B2 | | 4/2014 | Mashue et al. |
| 8,727,629 | B2 | | 5/2014 | Do et al. |
| 8,727,632 | B2 | | 5/2014 | Do et al. |
| 8,777,802 | B2 | | 7/2014 | Erno et al. |
| 8,814,437 | B2 | * | 8/2014 | Braun ................. B29C 67/0051 29/898.067 |
| 8,857,192 | B2 | | 10/2014 | Huang et al. |
| 8,904,746 | B2 | | 12/2014 | Fang et al. |
| 8,967,879 | B2 | * | 3/2015 | Braun ................. F16C 33/4635 384/572 |
| 2004/0179762 | A1 | * | 9/2004 | Doll ....................... F16C 33/445 384/492 |
| 2008/0260317 | A1 | * | 10/2008 | Earthrowl ............... F16C 19/26 384/577 |
| 2009/0220181 | A1 | * | 9/2009 | Yamada ............... F16C 33/3812 384/513 |
| 2010/0303626 | A1 | * | 12/2010 | Mostafi ................ F16H 1/2827 416/170 R |
| 2015/0337901 | A1 | * | 11/2015 | Hayashi ............... F16C 33/4635 384/527 |
| 2016/0040714 | A1 | | 2/2016 | Heiss et al. |

FOREIGN PATENT DOCUMENTS

| | | | | |
|---|---|---|---|---|
| CN | 104455003 | A | | 3/2015 |
| DE | 3424742 | C1 | * | 11/1985 ............. B29C 33/10 |
| DE | 102007057550 | A1 | * | 6/2009 .......... F16C 33/4629 |
| EP | 2803436 | A2 | | 11/2014 |
| JP | H09177794 | A | | 7/1977 |
| JP | H10252747 | A | | 9/1998 |
| JP | 2014005913 | A | | 1/2014 |
| JP | 2015102144 | A | | 6/2015 |
| JP | 2015218842 | A | | 12/2015 |

OTHER PUBLICATIONS

Baumgartner, H.R. et al.; "Rolling Contact Fatigue of Hot-Pressed Silicon Nitride Versus Surface Preparation Techniques"; Surfaces and Interfaces of Glass and Ceramics; vol. 7, pp. 179-193, 1974.

* cited by examiner

ROLLER BEARING CAGE FOR USE IN A GEARBOX

BACKGROUND

The present disclosure relates generally to an epicyclic gearbox assembly and, more specifically, to a lightweight roller bearing cage.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

The drive shafts in the turbine engine are typically supported by one or more bearings, and at least some known turbofans include a speed-reducing gearbox coupled along the drive shaft between the low-pressure turbine and the fan. The gearbox facilitates decoupling the fan tip speed from the speed of the low-pressure turbine. For example, at least some known gearboxes include a sun gear engaged with and rotatably mounted radially inward relative to a plurality of planetary gears. The planetary gears each include a roller bearing cage having a plurality of pocket holes sized to receive roller elements therein. The roller bearing cage is typically formed from a solid, metallic material. In operation, the planetary gears sometimes rotate circumferentially about the sun gear, and also rotate about an axis. As such, when rotated, the mass of the roller bearing cage produces inertia and centrifugal loading such that strain is induced to the roller bearing cage. The amount of strain induced to the roller bearing cage is directly proportional to the rotational speed of the planetary gears and the mass of the roller bearing cage.

BRIEF DESCRIPTION

In one aspect, a roller bearing cage is provided. The roller bearing cage includes a cylindrical body including a plurality of pocket holes defined within and positioned circumferentially about the cylindrical body. At least a portion of the cylindrical body is hollow. The roller bearing cage further includes a reinforcement structure extending within the portion of the cylindrical body. The reinforcement structure is configured to provide a stiffening force to the cylindrical body.

In another aspect, a gearbox for use in a turbine engine is provided. The gearbox includes a central gear and a plurality of planetary gears positioned circumferentially about the central gear and configured to rotate relative to the central gear. Each planetary gear includes a roller bearing cage that includes a cylindrical body including a plurality of pocket holes defined within and positioned circumferentially about the cylindrical body. At least a portion of the cylindrical body is hollow. The roller bearing cage further includes a reinforcement structure extending within the portion of the cylindrical body. The reinforcement structure is configured to provide a stiffening force to the cylindrical body.

In yet another aspect, a turbine engine assembly is provided. The turbine engine assembly includes a fan section, a turbine section, and a gearbox coupled between the fan section and the turbine section. The gearbox includes a plurality of planetary gears that each includes a roller bearing cage. The roller bearing cage includes a cylindrical body including a plurality of pocket holes defined within and positioned circumferentially about the cylindrical body. At least a portion of the cylindrical body is hollow. The roller bearing cage further includes a reinforcement structure extending within the portion of said cylindrical body. The reinforcement structure is oriented within the portion of said cylindrical body based on directional loading received at different sections of the cylindrical body during operation of the gearbox.

DRAWINGS

These and other features, aspects, and advantages of the present disclosure will become better understood when the following detailed description is read with reference to the accompanying drawings in which like characters represent like parts throughout the drawings, wherein.

Figure 1:
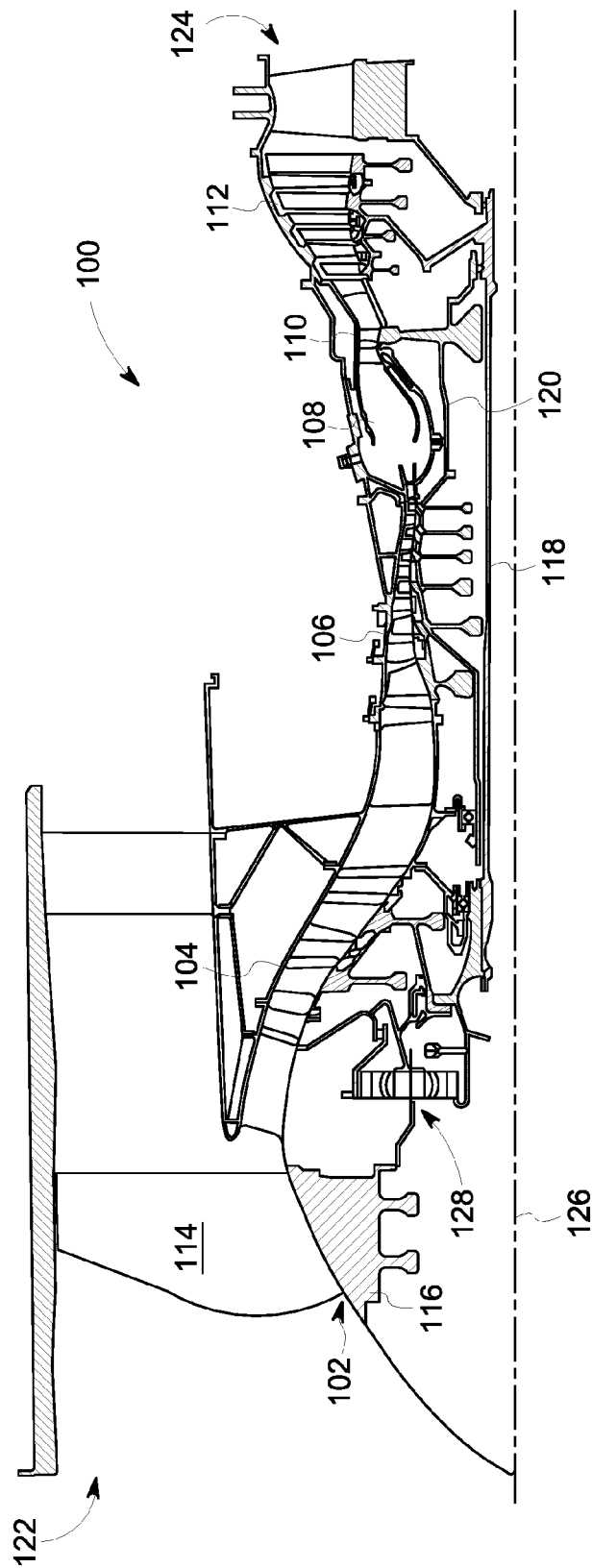
FIG. 1 is a schematic illustration of an exemplary turbine engine assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the roller bearing cage. Moreover, the terms "radial" and "radially" refer to directions and orientations that extend substantially perpendicular to the centerline of the turbine engine or the roller bearing cage. In addition, as used herein, the terms "circumferential" and "circumferentially" refer to directions and orientations that extend arcuately about the centerline of the turbine engine or the roller bearing cage.

Embodiments of the present disclosure relate to a lightweight roller bearing cage. More specifically, the roller bearing cage includes a cylindrical body that is at least partially hollow for reducing its mass, and thus reducing the deformation energy and centrifugal load induced therefrom due to inertia during operation of an associated gear assembly. In some embodiments, a reinforcement structure extends within hollow portions of the cylindrical body to increase the stiffness of the cylindrical body. As such, the reduced mass of the lightweight roller bearing cage results in reduced stress induced by a centrifugal acceleration field, and facilitates utilization of high speed, small reduction ratio, planetary integral drive systems.

FIG. 1 is a schematic illustration of an exemplary turbine engine assembly 100 including a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine assembly 100 also includes a high-pressure turbine 110 coupled in flow communication with combustor 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine assembly 100 has an intake 122 and an exhaust 124. Turbine engine assembly 100 further includes a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine 112.

In operation, air entering turbine engine assembly 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor 108, mixed with fuel, and the mixture is combusted within combustor 108. High temperature combustion gas generated by combustor 108 is channeled towards turbine assemblies 110 and 112. Low-pressure turbine 112 rotates at a first rotational speed, and gearbox 128 operates such that fan assembly 102 operates at a second rotational speed lower than the first rotational speed. Combustion gas is subsequently discharged from turbine engine assembly 100 via exhaust 124. In an alternative embodiment, the rotational speeds of low-pressure turbine 112 and fan assembly 102 are decoupled by any mechanism or arrangement of components that enables turbine engine assembly 100 to function as described herein.

Figure 2:
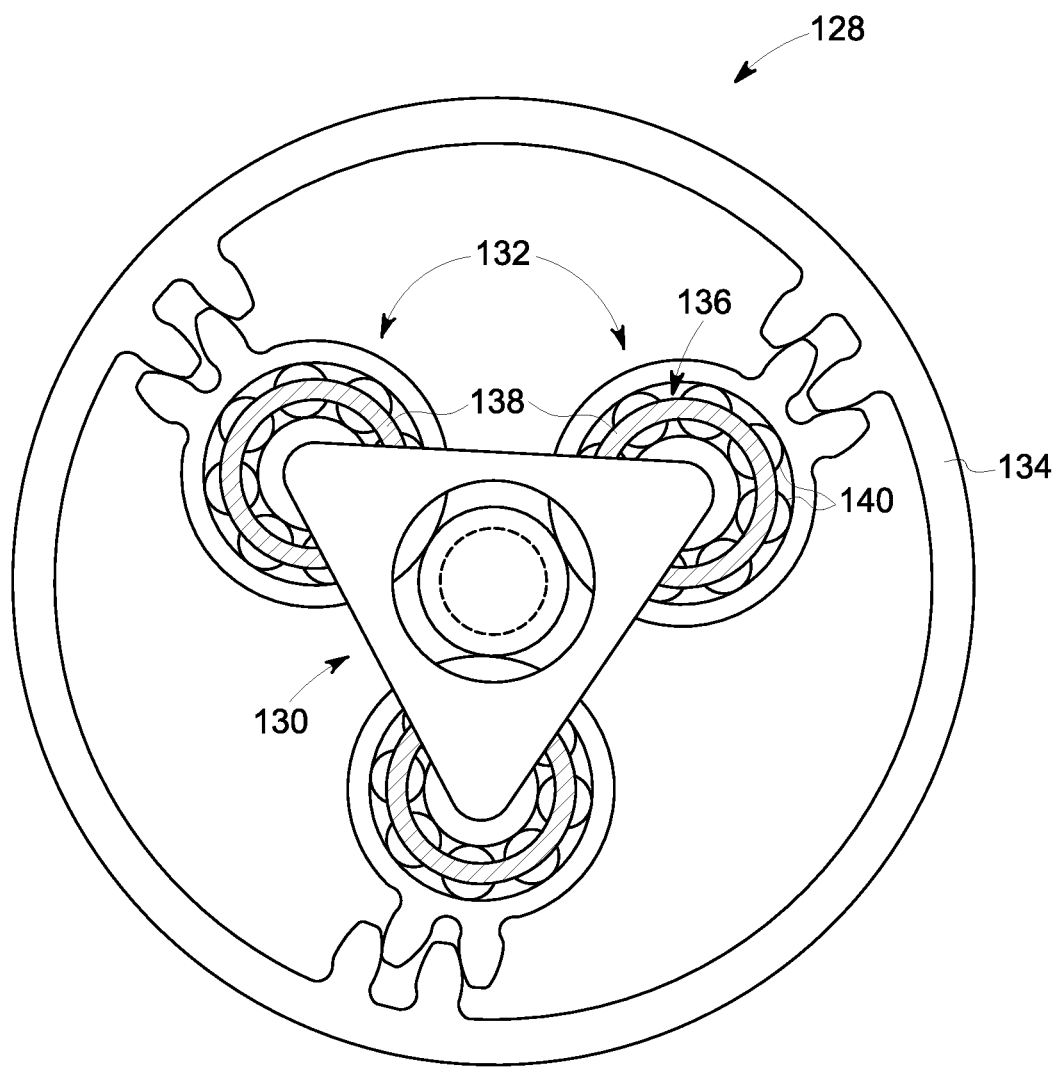
FIG. 2 is an end view of an exemplary gearbox that may be used in the turbine engine assembly shown in FIG. 1.

FIG. 2 is an end view of gearbox 128 that may be used in turbine engine assembly 100 (shown in FIG. 1). In the exemplary embodiment, gearbox 128 includes a least one sun or central gear 130, and a plurality of planetary gears 132 that are each rotatably coupled to central gear 130. Gearbox 128 further includes a ring gear 134 coupled to and extending about the plurality of planetary gears 132. The plurality of planetary gears 132 are positioned circumferentially about central gear 130, and rotate relative to central gear 130 during operation of gearbox 128. As described above, central gear 130 and planetary gears 132 cooperate to produce differential speeds for different portions of turbine engine assembly 100.

In the exemplary embodiment, each planetary gear 132 includes a bearing assembly 136 that operates to facilitate rotating planetary gears 132 freely with respect to central gear 130, and to facilitate rotating planetary gears 132 about central gear 130 upon actuation of ring gear 134. Bearing assembly 136 includes a roller bearing cage 138 and a plurality of roller elements 140 at least partially housed within roller bearing cage 138. More specifically, roller elements 140 are received within respective pocket holes (not shown) defined within roller bearing cage 138, as will be described in more detail below.

Figure 3:
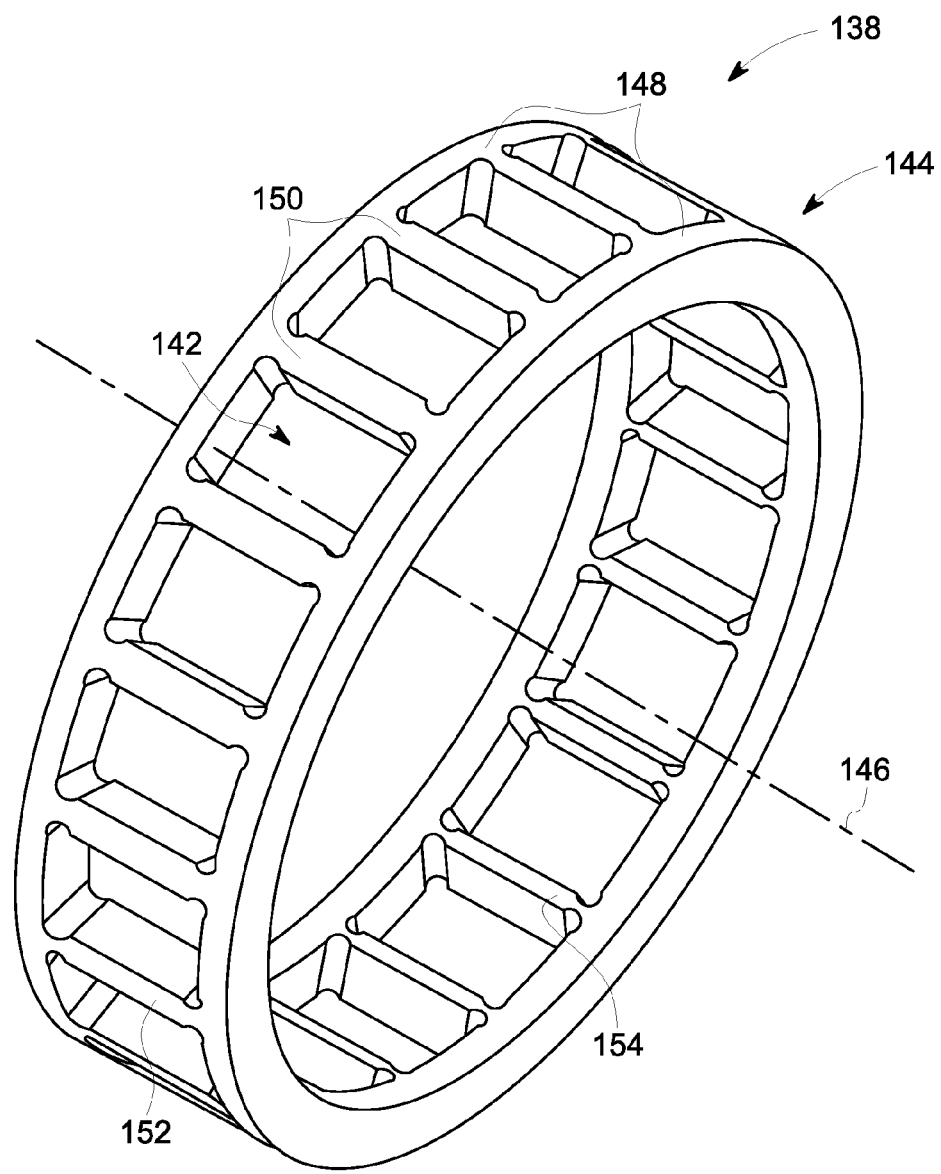
FIG. 3 is a perspective view of an exemplary roller bearing cage that may be used in the gearbox shown in FIG. 2.

FIG. 3 is a perspective view of an exemplary roller bearing cage 138 that may be used in gearbox 128 (shown in FIG. 2). In the exemplary embodiment, roller bearing cage 138 includes a cylindrical body 144 including a plurality of pocket holes 142 defined within and positioned circumferentially about cylindrical body 144. Specifically, pocket holes 142 are positioned circumferentially relative to a centerline 146 of cylindrical body 144. Roller bearing cage 138 further includes a pair of circumferential side rails 148 and a plurality of web members 150 extending between the pair of circumferential side rails 148, such that pocket holes 142 are defined therebetween. In addition, pocket holes 142 are formed within cylindrical body 144 such that an outer radial portion 152 of web members 150 is thicker than an inner radial portion 154 of web members 150.

As described above, roller elements 140 (shown in FIG. 2) are received within respective pocket holes 142. More specifically, roller elements 140 are radially inserted within each pocket hole 142. Pocket holes 142 are oversized relative to roller elements 140 such that roller elements 140 freely move within pocket holes 142 and are forced against circumferential side rails 148 and/or web members 150 when a centrifugal load is induced during operation of gearbox 128. As such, roller bearing cage 138 guides circumferential and axial movement of roller elements 140 through pocket holes 142.

Figure 4:
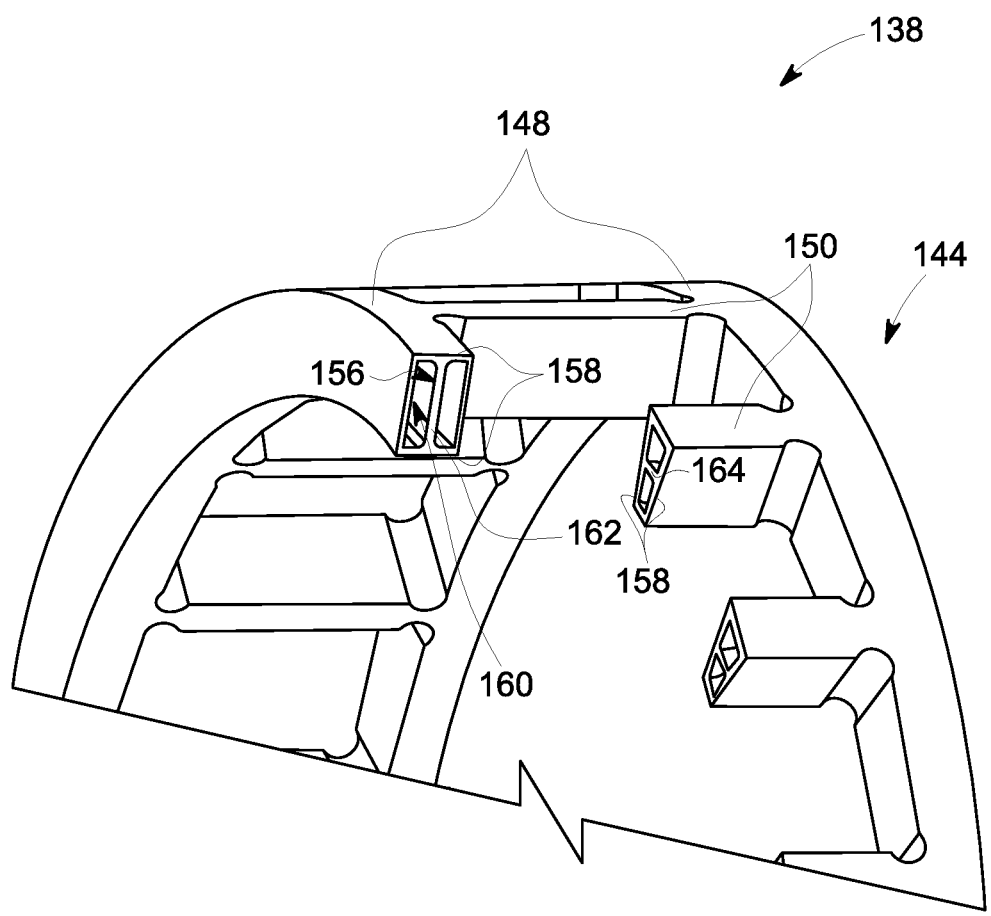
FIG. 4 is a partial cutaway view of the roller bearing cage shown in FIG. 3.
Figure 5:
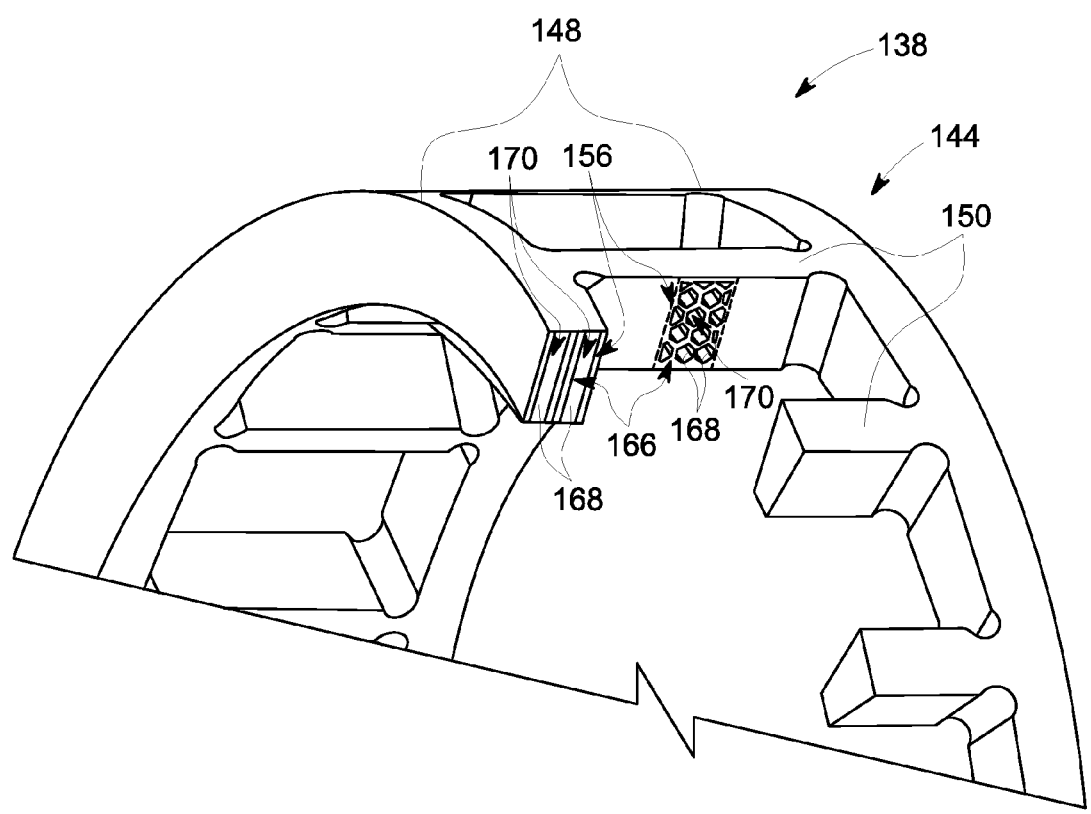
FIG. 5 is a partial cutaway and partially transparent view of the roller bearing cage shown in FIG. 3 including an alternative reinforcement structure.
Figure 6:
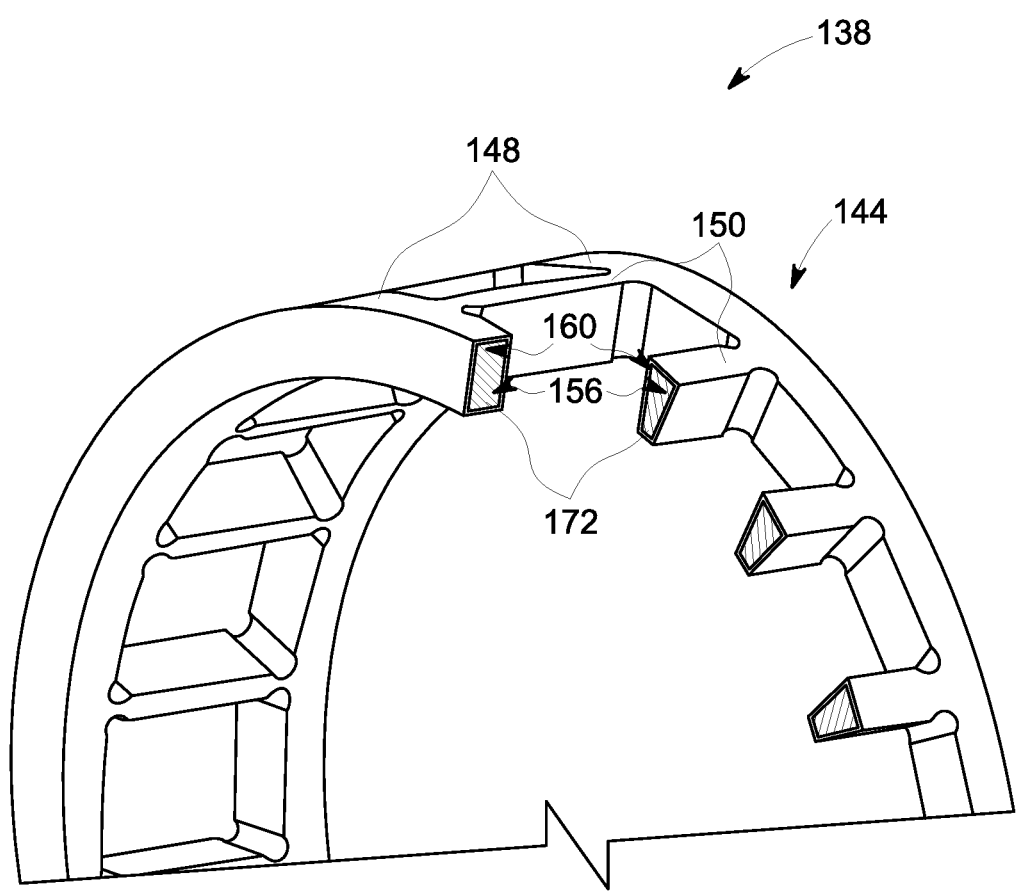
FIG. 6 is a partial cutaway view of the roller bearing cage shown in FIG. 3 including another alternative reinforcement structure.

FIG. 4 is a partial cutaway view of the roller bearing cage 138, FIG. 5 is a partial cutaway and partially transparent view of roller bearing cage 138 including an alternative reinforcement structure, and FIG. 6 is a partial cutaway view of roller bearing cage 138 including another alternative reinforcement structure. In the exemplary embodiment, at least a portion of cylindrical body 144 is hollow for reducing the mass of roller bearing cage 138. Roller bearing cage 138 further includes a reinforcement structure 156 extending within the portion of cylindrical body 144 that is hollow. As such, reinforcement structure 156 provides a stiffening force to cylindrical body 144, and reintroduces structural integrity to the hollow portions of cylindrical body 144. In an alternative embodiment, reinforcement structure 156 is omitted from cylindrical body 144, and cylindrical body 144 is completely hollow for reducing the mass of roller bearing cage 138.

As described above, roller bearing cage 138 includes a pair of circumferential side rails 148 and a plurality of web members 150 extending between the pair of circumferential side rails 148. In the exemplary embodiment, at least one of the pair of circumferential side rails 148 and the plurality of web members 150 are hollow for receiving reinforcement structure 156 therein. More specifically, the hollow portion of cylindrical body 144 includes opposing side walls 158 defining a hollow interior 160 sized to receive reinforcement structure 156 therein.

Reinforcement structure 156 may be embodied as any suitable structural support that enables roller bearing cage 138 to function as described herein. In addition, in some embodiments, reinforcement structure 156 is oriented within hollow interior 160 based on a predetermined direction of greatest directional loading received at different sections of cylindrical body 144 during operation of gearbox 128 (shown in FIG. 2). For example, during operation of gearbox 128, the greatest load induced to the pair of circumferential side rails 148 is in a radial direction as a result of centrifugal loading, and the greatest load induced to the plurality of web members 150 is in a circumferential direction as a result of engagement with rotating rolling elements 140 (shown in FIG. 2). In some embodiments, reinforcement structure 156 provides a directional stiffening force, in that reinforcement structure 156 provides a greater stiffening force in one direction than in another direction. As such, reinforcement structure 156 is positioned such that the directional stiffening force provided therefrom is oriented for offsetting the directional loading induced to the different sections of cylindrical body 144.

For example, referring to FIG. 4, reinforcement structure 156 includes a first rib member 162 extending between opposing side walls 158 of the pair of circumferential side rails 148 and a second rib member 164 extending between opposing side walls 158 of the plurality of web members 150. First rib member 162 and second rib member 164 facilitate increasing the shear and bending load stiffness of roller bearing cage 138. As described above, reinforcement structure 156 is oriented based on directional loading received at different section of cylindrical body 144. In the exemplary embodiment, first rib member 162 extending within the pair of circumferential side rails 148 is oriented radially relative to centerline 146 (shown in FIG. 3) of cylindrical body 144. In addition, second rib member 164 extending within the plurality of web members 150 is oriented circumferentially relative to centerline 146 of cylindrical body 144. As such, the directional stiffening force provided by first rib member 162 is oriented radially relative to centerline 146, and the directional stiffening force provided by second rib member 164 is oriented circumferentially relative to centerline 146 to facilitate offsetting the directional loading induced to the different sections of cylindrical body 144.

Referring to FIG. 5, reinforcement structure 156 includes a honeycomb structure 166 extending within the hollow portions of cylindrical body 144. Honeycomb structure 166 includes a plurality of side walls 168 oriented for defining a plurality of hollow channels 170. As described above, reinforcement structure 156 is oriented within hollow interior 160 based on a predetermined direction of greatest directional loading received at different sections of cylindrical body 144. In the exemplary embodiment, honeycomb structure 166 positioned within the pair of circumferential side rails 148 is oriented such that side walls 168 extend radially relative to centerline 146 (shown in FIG. 3) of cylindrical body 144. In addition, honeycomb structure 166 positioned within the plurality of web members 150 is oriented such that side walls 168 extend circumferentially relative to centerline 146 of cylindrical body 144. As such, the directional stiffening force provided by honeycomb structure 166 positioned within the pair of circumferential side rails 148 is oriented radially relative to centerline 146, and the directional stiffening force provided by honeycomb structure 166 positioned within the plurality of web members 150 is oriented circumferentially relative to centerline 146 to facilitate offsetting the directional loading induced to the different sections of cylindrical body 144.

Referring to FIG. 6, reinforcement structure 156 includes a predetermined amount of filler material 172 that fills hollow interior 160. Filler material 172 is fabricated from any material that enables reinforcement structure 156 to function as described herein. In the exemplary embodiment, filler material 172 is different from the material used to fabricate cylindrical body 144. In one embodiment, cylindrical body 144 is fabricated from a metallic material. In addition, filler material 172 is less dense than the material used to fabricate cylindrical body 144 such that the mass of roller bearing cage 138 is reduced even when hollow interior 160 is filled with filler material 172. Exemplary filler material 172 includes, but is not limited to, a polyether ether ketone material, and a foam material, such as metal foam or wire mesh.

Roller bearing cage 138 may be formed using any manufacturing technique that enables gearbox 128 to function as described herein. For example, to achieve the at least partially hollow structure, roller bearing cage 138 is formed using an additive manufacturing technique. Alternatively, roller bearing cage 138 is formed using an investment casting or brazing technique.

Embodiments of the roller bearing cage, as described above, enable the use of high speed, small reduction ratio, planetary integral drive systems. More specifically, bearings of planetary integral drive systems are subjected to high centrifugal loads as a result of rotation of the planet carrier. The mass of the roller bearing cage is reduced to facilitate reducing the amount of stress induced by the high centrifugal loads. In addition, the roller bearing cage includes a reinforcement structure that reintroduces structural integrity into the roller bearing cage, while still resulting in a reduced mass of the roller bearing cage. As such, strain on the roller bearing cage is mitigated, which enables the roller bearing cage to withstand greater centrifugal loads caused by rotation of the planet carrier.

An exemplary technical effect of the roller bearing cage described herein includes at least one of: (a) reducing the mass of the roller bearing cage, and thus reducing strain induced to the roller bearing cage from centrifugal loading; (b) increasing the service life of planetary gears in a gear assembly; and (c) enabling the planetary gears to be operated with greater centrifugal loading.

Exemplary embodiments of gear assembly and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine assembles and related methods as described herein. Rather, the exemplary embodiment can be implemented and utilized in connection with many applications where increasing the service life of a bearing is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A roller bearing cage comprising:
    a cylindrical body comprising a plurality of pocket holes defined within and positioned circumferentially about said cylindrical body, wherein at least a portion of said cylindrical body is hollow; and
    a reinforcement structure extending within said portion of said cylindrical body, wherein said reinforcement structure is oriented within said portion of said cylindrical body based on directional loading received at different sections of said cylindrical body.

2. The roller bearing cage in accordance with claim 1, wherein said cylindrical body comprises a pair of circumferential side rails and a plurality of web members extending between said pair of circumferential side rails, at least one of said pair of circumferential side rails and said plurality of web members are hollow and configured to receive said reinforcement structure therein.

3. The roller bearing cage in accordance with claim 1, wherein said portion of said cylindrical body comprises opposing side walls defining an interior sized to receive said reinforcement structure.

4. The roller bearing can in accordance with claim 3, wherein said reinforcement structure comprises a rib member extending between said opposing side walls.

5. The roller bearing cage in accordance with claim 4, wherein said cylindrical body comprises a pair of circumferential side rails that are hollow, said rib member emending within said, pair of circumferential side rails and oriented radially relative to a centerline of said cylindrical body.

6. The roller bearing cage in accordance with claim 4, wherein said cylindrical body comprises a plurality of web members that are hollow, said rib member extending within said plurality of web members and oriented circumferentially relative to a centerline of said cylindrical body.

7. The roller bearing cage in accordance with claim 3, wherein said reinforcement structure comprises a predetermined amount of filler material configured to fill said interior.

8. The roller bearing cage in accordance with claim 3, wherein said reinforcement structure comprises a honeycomb structure.

9. A gearbox for use in a turbine engine, said gearbox comprising.:
    a central gear; and
    a plurality of planetary gears positioned circumferentially about said central gear and configured to rotate relative to said central gear, each planetary gear comprising a roller bearing cage and a plurality of roller elements at least partially housed within the roller bearing cage, the roller bearing cage comprising:
        a cylindrical body comprising a plurality of pocket holes defined within and positioned circumferentially about said cylindrical body, wherein at least a portion of said cylindrical body is hollow; and
        a reinforcement structure extending within said portion of said cylindrical body, wherein said reinforcement structure is oriented within said portion of said cylindrical body based on directional loading received at different sections of said cylindrical body during operation of said gearbox.

10. The gearbox in accordance with claim 9, wherein said cylindrical body comprises a pair of circumferential side rails and a plurality of web members extending between said pair of circumferential side rails, at least one of said pair of circumferential side rails and said plurality of web members are hollow and configured to receive said reinforcement structure therein.

11. The gearbox in accordance with claim 9, wherein said portion of said, cylindrical body comprises opposing side walls defining an interior sized to receive said reinforcement structure.

12. The gearbox in accordance with claim 11, wherein said reinforcement structure comprises a rib member extending between said opposing side walls.

13. The gearbox in accordance with claim 12, wherein said cylindrical body comprises a pair of circumferential side rails that are hollow, said rib member extending within said pair of circumferential side rails and oriented radially relative to a centerline of said cylindrical body.

14. The gearbox in accordance with claim 12. Wherein said cylindrical body comprises a plurality of web members that are hollow, said rib member extending within said plurality of web members and oriented circumferentially relative to a centerline of said cylindrical body.

15. The gearbox in accordance with claim 11, wherein, said reinforcement structure comprises a predetermined amount of filler material configured to fill said hollow interior.

16. The gearbox in accordance with claim 11, wherein said reinforcement structure comprises a honeycomb structure.

17. A turbine engine assembly comprising:
    a fan section;
    a turbine section; and
    a gearbox coupled between said fan section and said turbine section, said gearbox comprising a plurality of planetary gears, each gear of said plurality of planetary gears comprises a roller bearing cage and a plurality of roller elements at least partially housed within the roller bearing cage, said roller bearing cage comprising:
        a cylindrical body comprising a plurality of pocket holes defined within and positioned circumferentially about said cylindrical body, wherein at least a portion of said cylindrical body is hollow; and
        a reinforcement structure extending within said portion of said cylindrical body, wherein said reinforcement structure is oriented within said portion of said cylindrical body based on directional loading received at different sections of said cylindrical body during operation of said gearbox.

18. The turbine engine assembly in accordance with claim 17, wherein said cylindrical body comprises a pair of circumferential side rails and a plurality of web members extending between said pair of circumferential side rails, at least one of said pair of circumferential side rails and said plurality of web members are hollow for receiving said reinforcement structure therein.

19. The turbine engine assembly in accordance with claim 18, wherein said reinforcement structure is configured to provide a directional stiffening force, said reinforcement structure within said pair of circumferential side rails oriented such that the directional stiffening force is oriented radially relative to a centerline of said cylindrical body.

20. The turbine engine assembly in accordance with claim 18, wherein said reinforcement structure is configured to provide a directional stiffening force, said reinforcement structure within said plurality of web portions oriented such that the directional stiffening force is oriented circumferentially relative to a centerline of said cylindrical body.

\* \* \* \* \*